(12) United States Patent
Glover

(10) Patent No.: US 12,114,226 B2
(45) Date of Patent: *Oct. 8, 2024

(54) VEHICLE-MOUNTED RANGING SYSTEM AND METHOD OF OPERATING THE SAME

(71) Applicant: Qorvo US, Inc., Greensboro, NC (US)

(72) Inventor: Kerry Cloyce Glover, Cross Roads, TX (US)

(73) Assignee: Qorvo US, Inc., Greensboro, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/231,137

(22) Filed: Aug. 7, 2023

(65) Prior Publication Data

US 2024/0048937 A1 Feb. 8, 2024

Related U.S. Application Data

(63) Continuation of application No. 17/514,065, filed on Oct. 29, 2021, now Pat. No. 11,722,841.
(Continued)

(51) Int. Cl.
*H04W 4/02* (2018.01)
*B60R 25/24* (2013.01)
(Continued)

(52) U.S. Cl.
CPC ........... *H04W 4/023* (2013.01); *B60R 25/241* (2013.01); *H04W 4/40* (2018.02); *H01Q 1/3275* (2013.01)

(58) Field of Classification Search
CPC ....... H04W 4/023; H04W 64/00; H04W 4/40; H04W 4/02; H04W 4/029; H04B 17/27;
(Continued)

(56) References Cited

U.S. PATENT DOCUMENTS 11,722,841 B2 * 8/2023 Glover ............... H04W 4/023
455/456.1
2007/0129879 A1 * 6/2007 Fedora ................. B64G 1/36
342/357.53
(Continued)

FOREIGN PATENT DOCUMENTS

EP 3927075 A1 12/2021
JP 2005098847 A * 4/2005 ............... G01S 3/50
(Continued)

OTHER PUBLICATIONS

Notice of Allowance for U.S. Appl. No. 17/514,065, mailed Mar. 24, 2023, 13 pages.

*Primary Examiner* — Dung Hong
(74) *Attorney, Agent, or Firm* — Withrow & Terranova, P.L.L.C.

(57) ABSTRACT

Disclosed is a vehicle-mounted ranging system and method. The vehicle-mounted ranging system has a communication transceiver configured to wirelessly communicate with at least one external communication transceiver and a plurality of ultra-wideband (UWB) transceivers configured to transmit and receive ranging pulses to and from at least one external UWB transceiver associated with the at least one external communication transceiver. A controller is interfaced between the communication transceiver and the plurality of UWB transceivers. The controller is configured to communicate with the associated at least one external communication transceiver to schedule transmission of ranging pulses between the plurality of UWB transceivers and the at least one external UWB transceiver and to calculate ranges between each of the plurality of UWB transceivers and the at least one external UWB transceiver based upon time-of-
(Continued)

arrival of ranging pulses transmitted between the plurality of UWB ranging transceivers and the at least one external UWB transceiver.

27 Claims, 13 Drawing Sheets

Related U.S. Application Data

(60) Provisional application No. 63/224,888, filed on Jul. 23, 2021, provisional application No. 63/137,398, filed on Jan. 14, 2021.

(51) Int. Cl.
*H01Q 1/32* (2006.01)
*H04W 4/40* (2018.01)

(58) Field of Classification Search
CPC ........ G01S 5/14; G01S 17/931; G01S 5/0289; G01S 17/06; G01S 17/86; G01S 17/88; G01S 5/0268
See application file for complete search history.

(56) References Cited

U.S. PATENT DOCUMENTS

| | | | | |
|---|---|---|---|---|
| 2011/0316747 | A1* | 12/2011 | Budianu | G01S 11/00 |
| | | | | 342/387 |
| 2012/0063547 | A1* | 3/2012 | Pietrzyk | H04B 1/71637 |
| | | | | 375/316 |
| 2018/0162321 | A1* | 6/2018 | Spiess | G07C 9/00309 |
| 2020/0082370 | A1* | 3/2020 | Yang | G06Q 20/20 |
| 2020/0305142 | A1* | 9/2020 | Jang | H04W 4/023 |
| 2021/0003685 | A1* | 1/2021 | Hong | G01S 11/023 |
| 2021/0099863 | A1* | 4/2021 | Naguib | H04W 12/63 |
| 2021/0136556 | A1* | 5/2021 | Lee | H04W 76/15 |
| 2021/0399761 | A1* | 12/2021 | Parthasarathi | H04B 7/0602 |
| 2022/0070613 | A1* | 3/2022 | Barton | H04B 1/7163 |
| 2022/0301371 | A1 | 9/2022 | Tertinek | |

FOREIGN PATENT DOCUMENTS

| | | | | |
|---|---|---|---|---|
| JP | 2019168439 A | * | 10/2019 | B60R 25/245 |
| KR | 20200028827 A | * | 3/2020 | H04W 4/80 |
| WO | WO-2019225430 A1 | * | 11/2019 | H04W 4/023 |

* cited by examiner

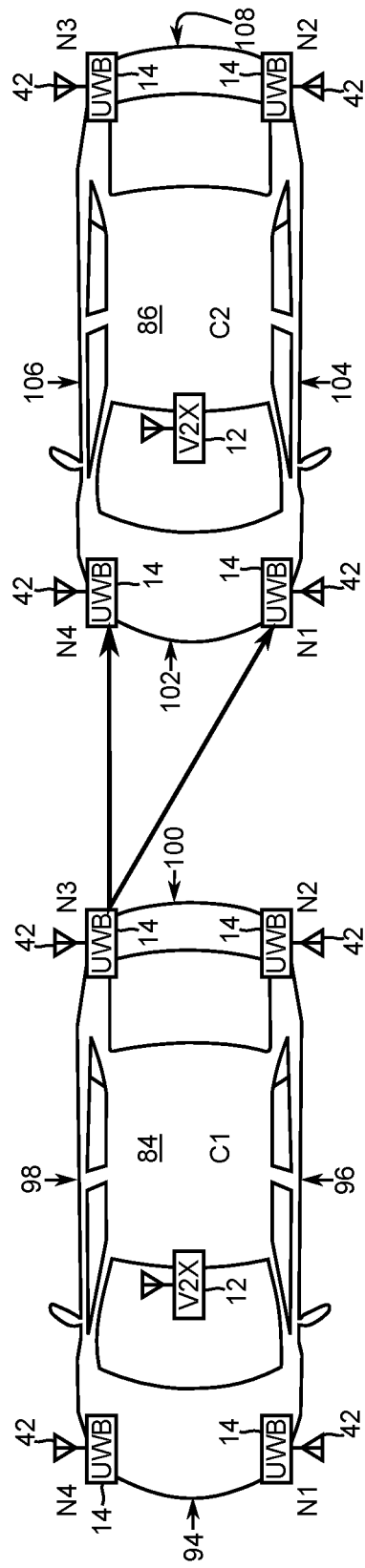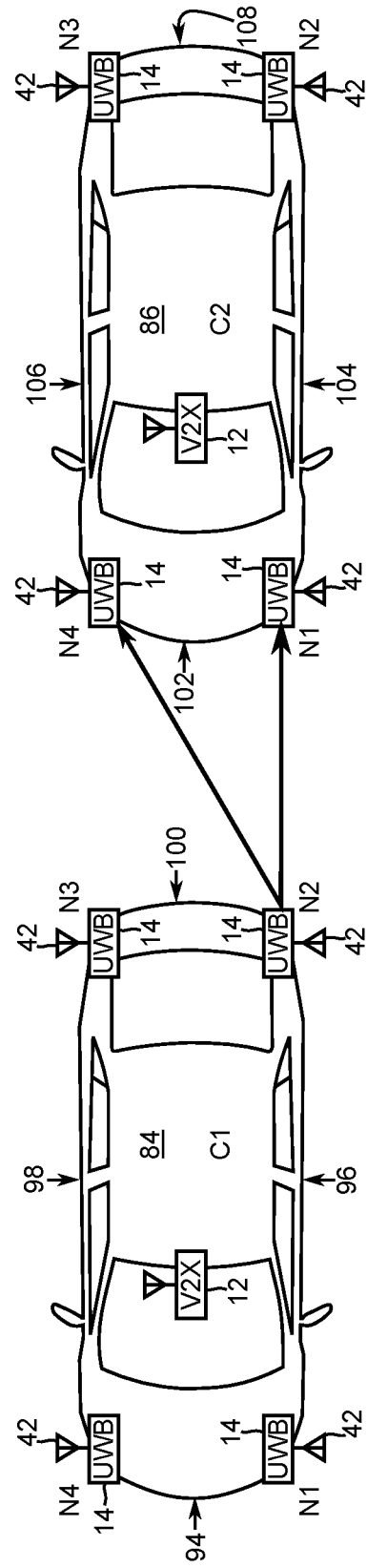

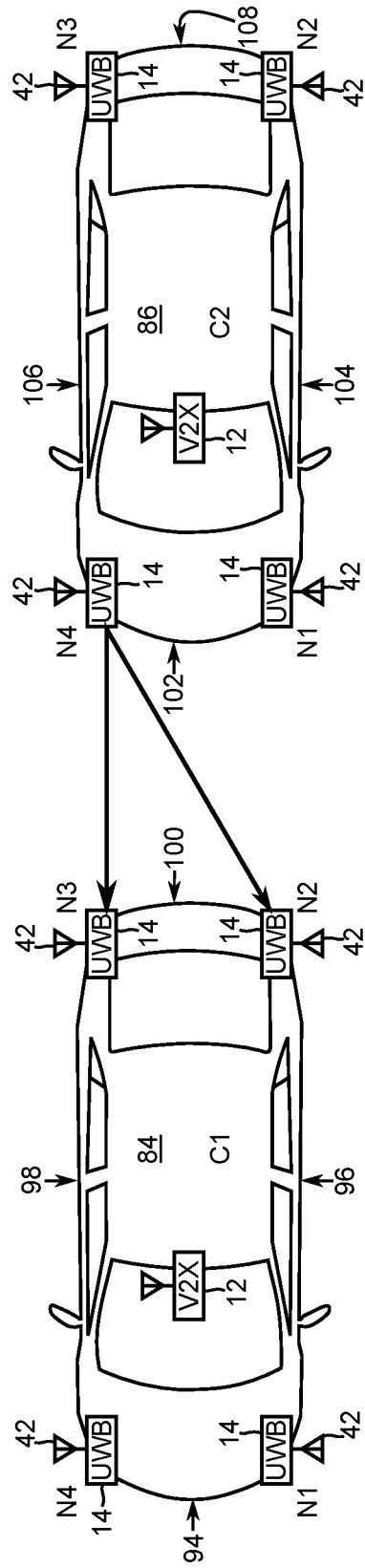
FIG. 6 (TIME SLOT 3)
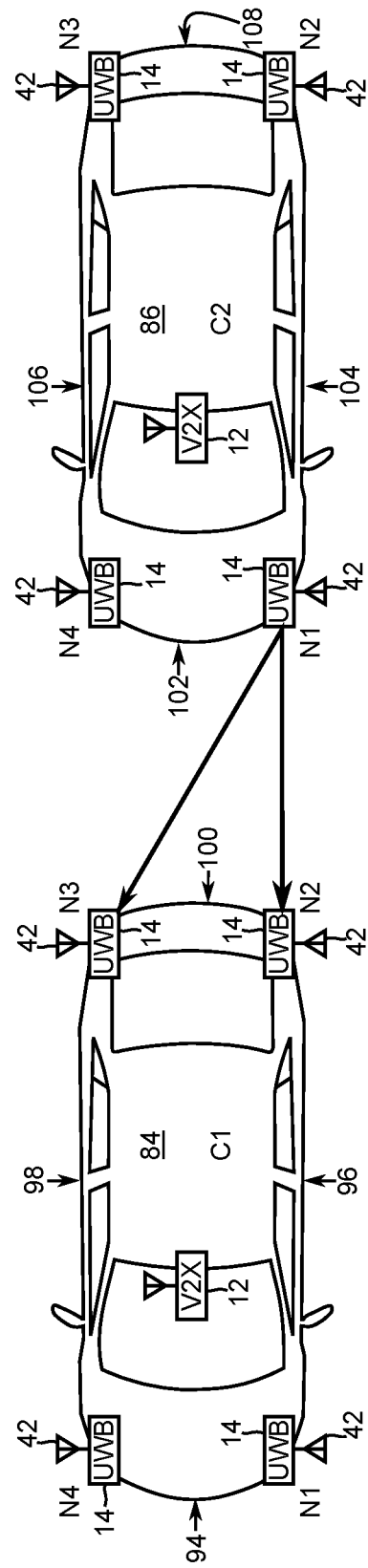
FIG. 7 (TIME SLOT 4)

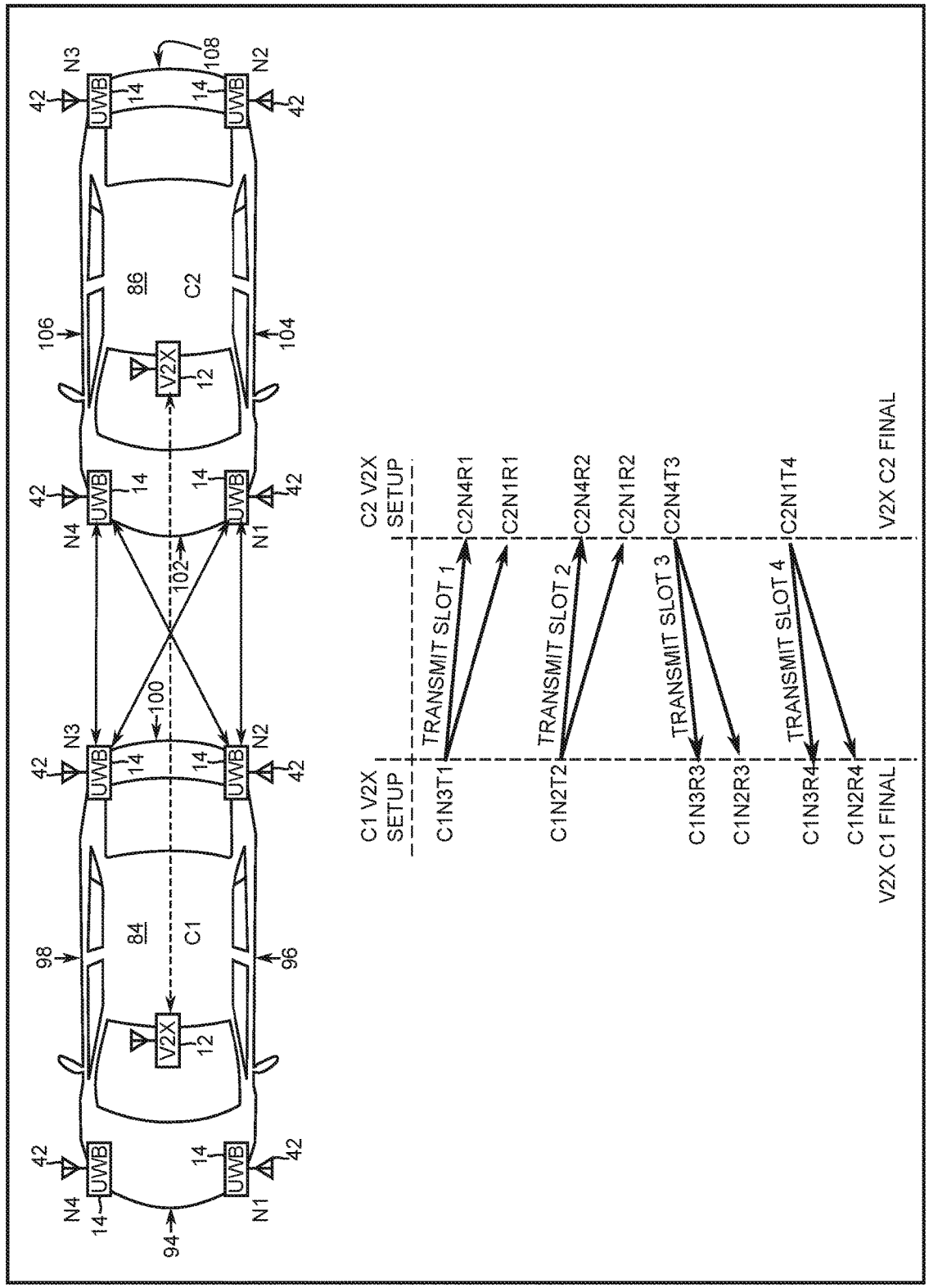
FIG. 8 (TOF CALCULATION)

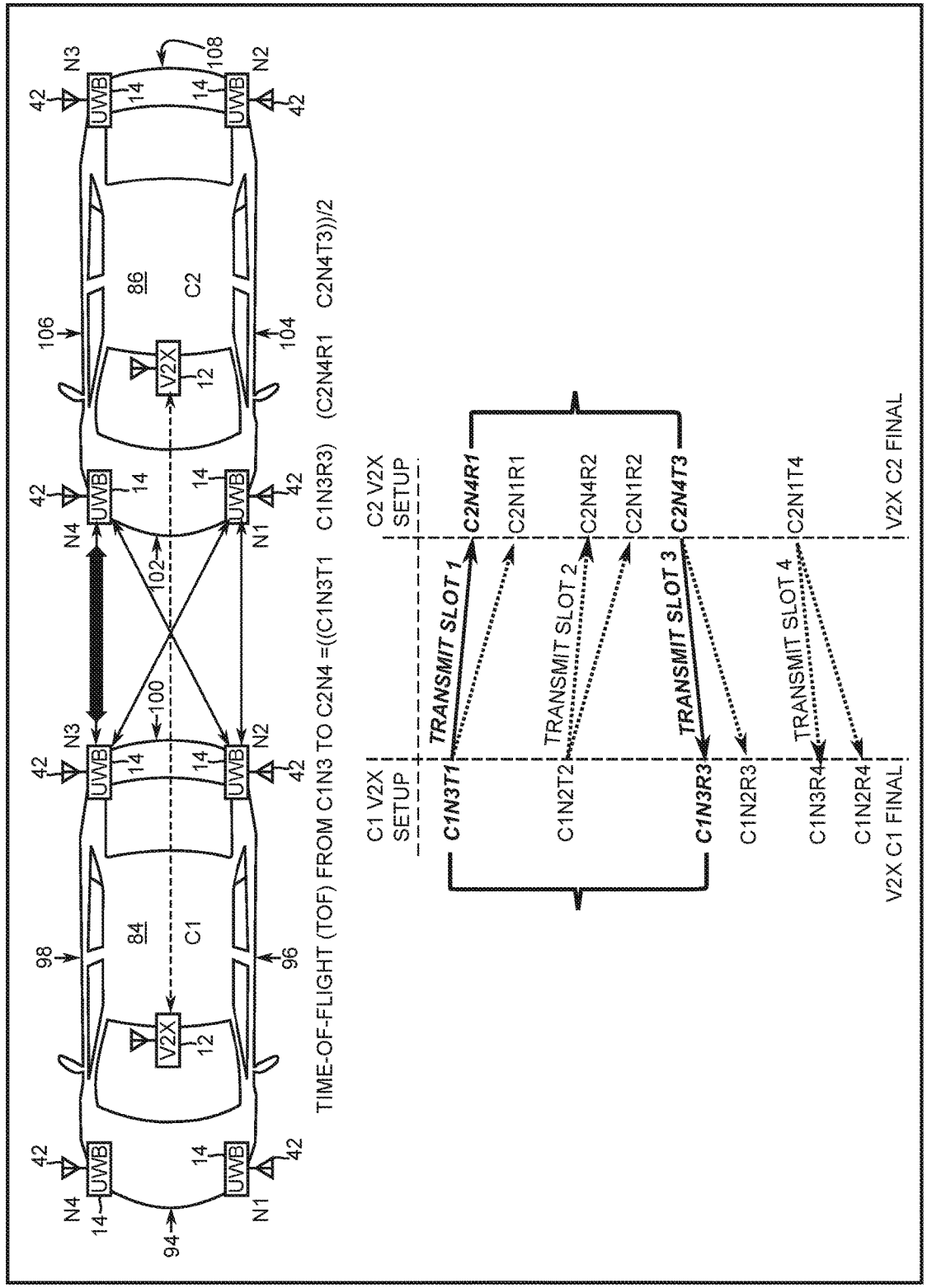
FIG. 9 (TOF CALCULATION)

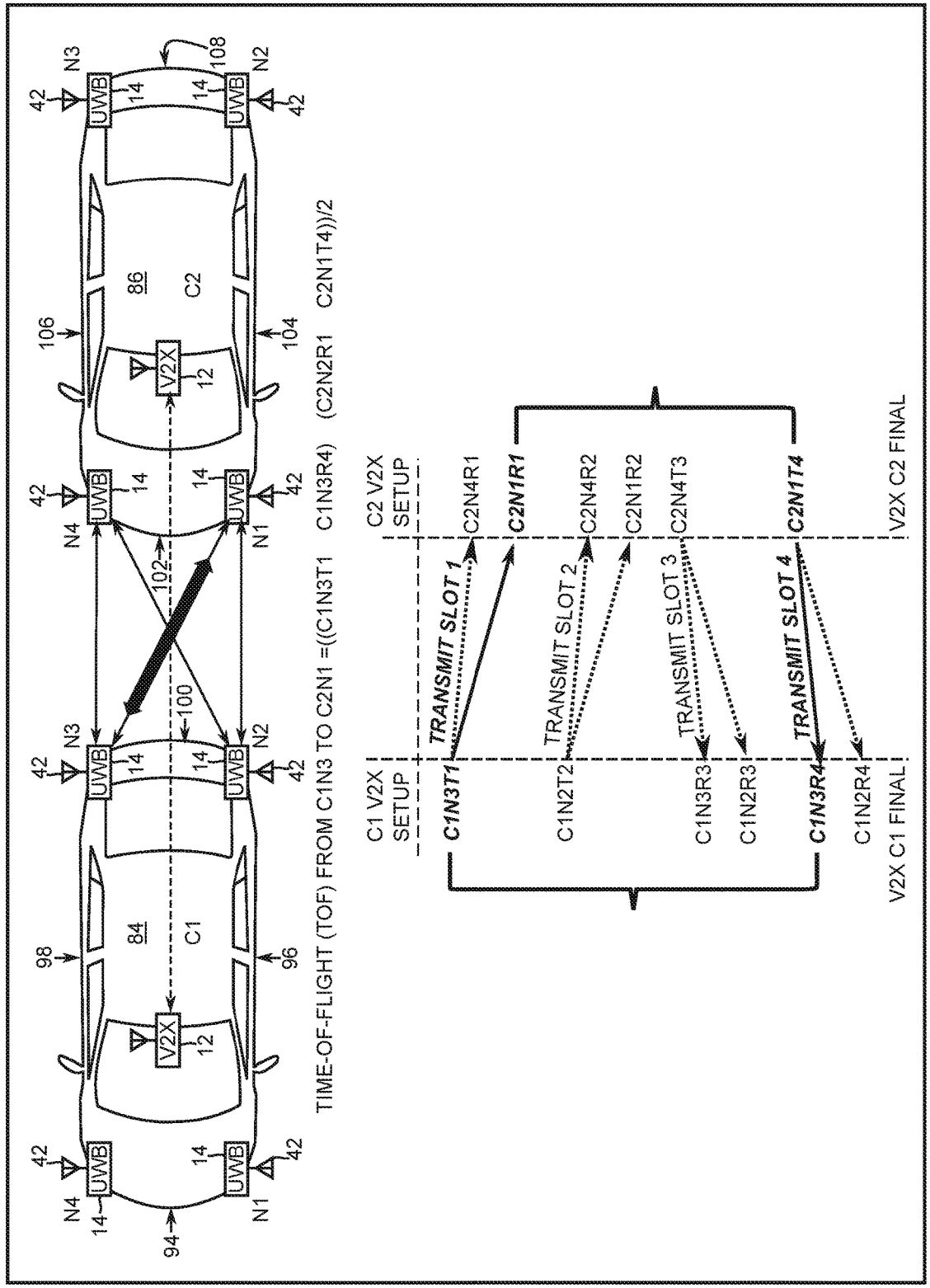
FIG. 10 (TOF CALCULATION)

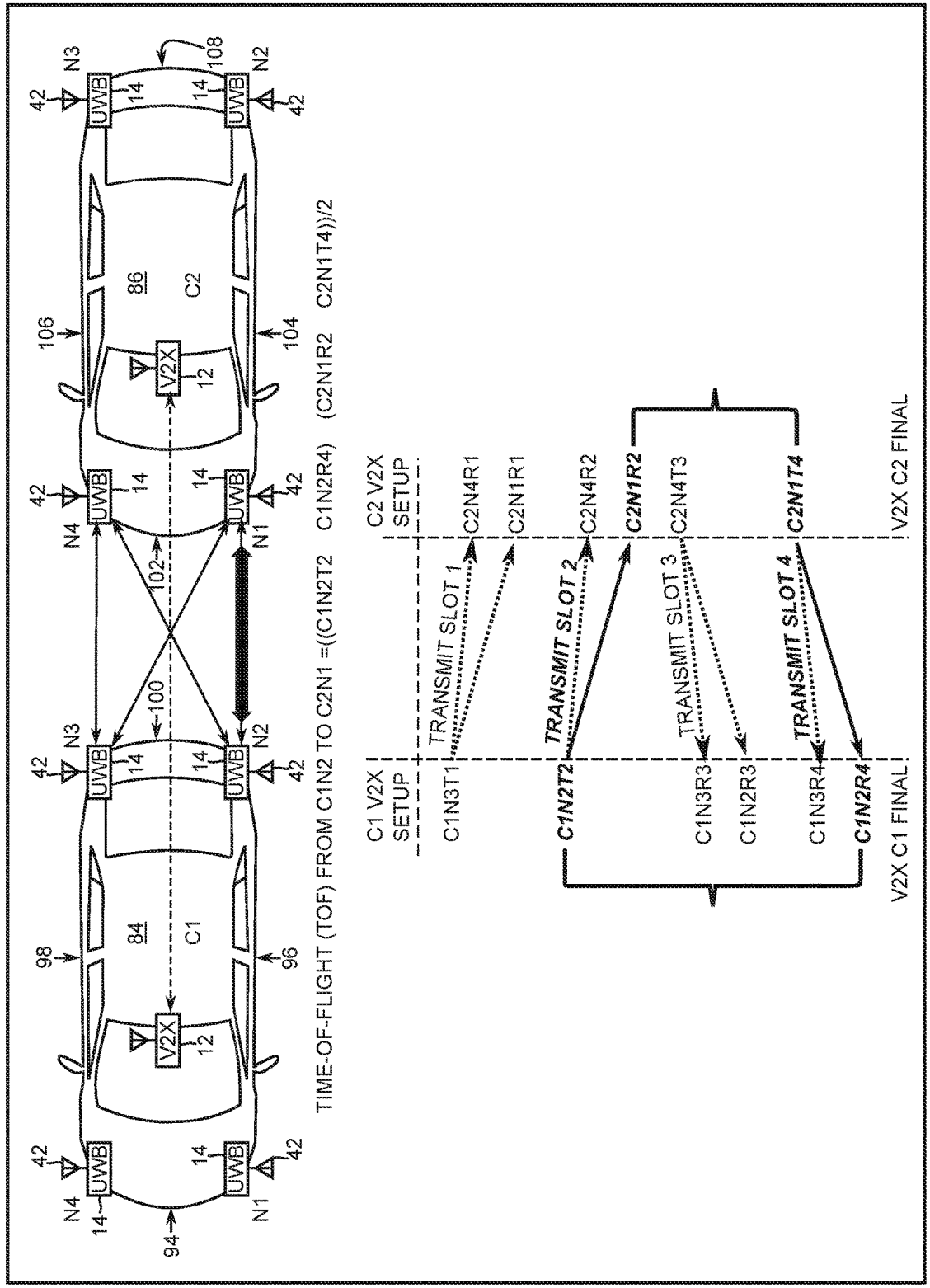
FIG. 11 (TOF CALCULATION)

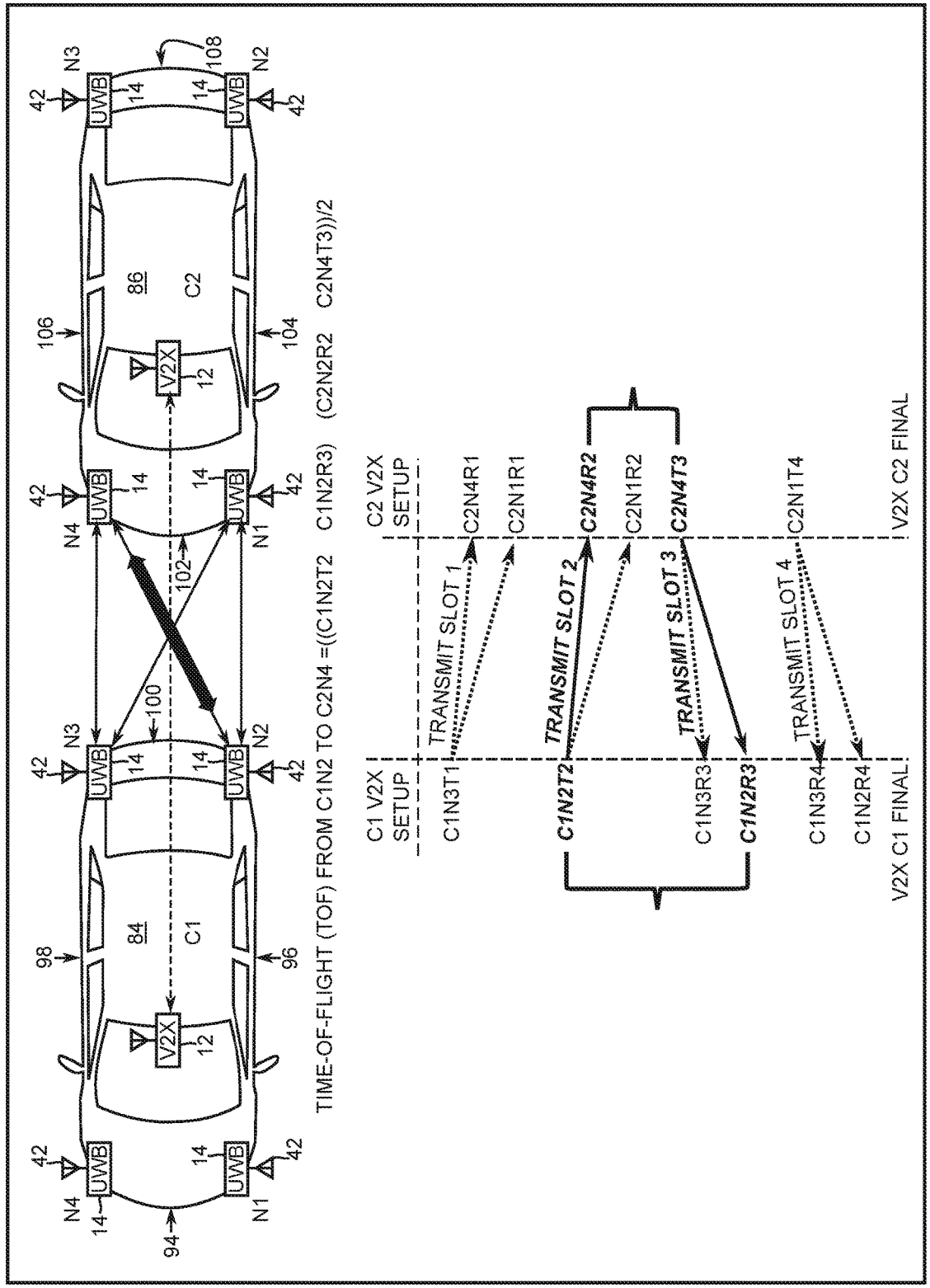
FIG. 12 (TOF CALCULATION)

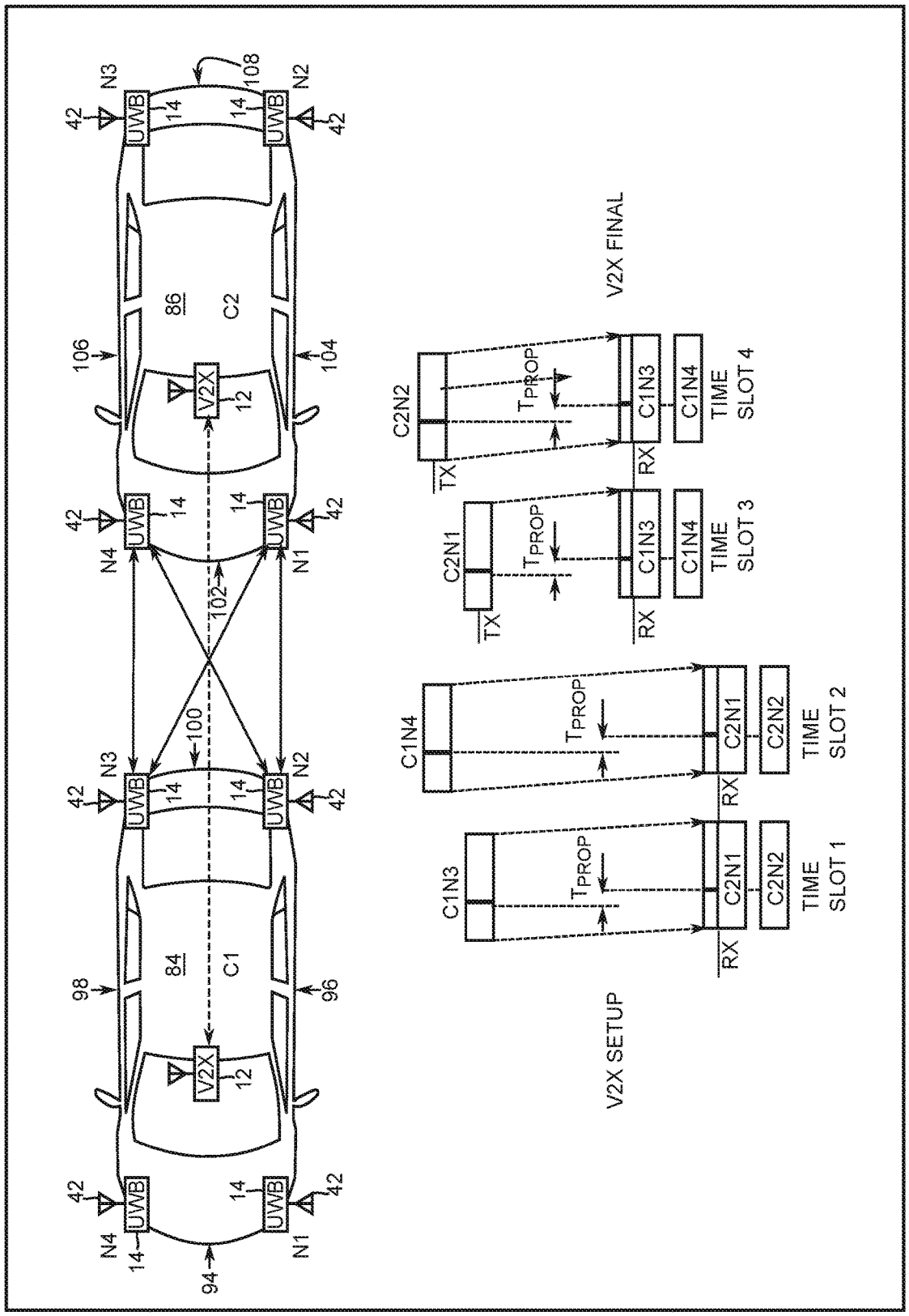
FIG. 13 (ROUND ROBIN 1.2mS)

FINALIZE DATA POLL       T = RECEIVED TIMESTAMP

| TRANSMIT TIME SLOTS | C1 N1 | C1 N2 | C1 N3 | C1 N4 | C4 N1 | C4 N2 | C4 N3 | C4 N4 | C3 N1 | C3 N2 | C3 N3 | C3 N4 | C2 N1 | C2 N2 | C2 N3 | C2 N4 |
|---|---|---|---|---|---|---|---|---|---|---|---|---|---|---|---|---|
| C1N1T1  |   |   |   |   | T |   |   |   |   |   |   |   |   |   |   |   |
| C1N2T2  |   |   |   |   | T |   | T | T |   |   |   |   | T |   |   | T |
| C1N3T3  |   |   |   |   |   |   | T |   | T | T |   |   | T |   |   |   |
| C1N4T4  |   |   |   |   |   |   |   | T | T |   |   | T |   |   |   |   |
| C4N1T5  | T |   |   |   |   |   |   |   |   |   |   |   |   |   |   |   |
| C4N2T6  |   | T | T |   |   |   |   |   |   |   |   |   |   |   |   |   |
| C4N3T7  | T | T |   |   |   |   |   |   |   | T |   |   |   |   |   |   |
| C4N4T8  | T |   |   | T |   |   |   |   |   |   |   |   |   |   |   |   |
| C3N1T9  |   |   | T | T |   |   | T |   |   |   |   |   |   |   |   |   |
| C3N2T10 |   | T | T |   |   |   |   | T |   |   |   |   |   |   |   |   |
| C3N3T11 |   |   |   | T |   |   |   |   |   |   |   |   |   |   |   |   |
| C3N4T12 |   | T |   |   |   |   |   |   |   | T |   |   | T |   |   |   |
| C2N1T13 |   |   |   |   |   |   |   |   | T |   |   |   |   |   |   |   |
| C2N2T14 |   |   |   |   |   |   |   | T |   |   |   |   |   |   |   |   |
| C2N3T15 |   |   | T | T |   |   |   | T | T | T | T | T |   |   |   |   |
| C2N4T16 |   |   |   | T |   |   |   |   |   |   | T |   |   |   |   |   |

FIG. 14 (ORTHOGONAL SIGNAL MATRIX)

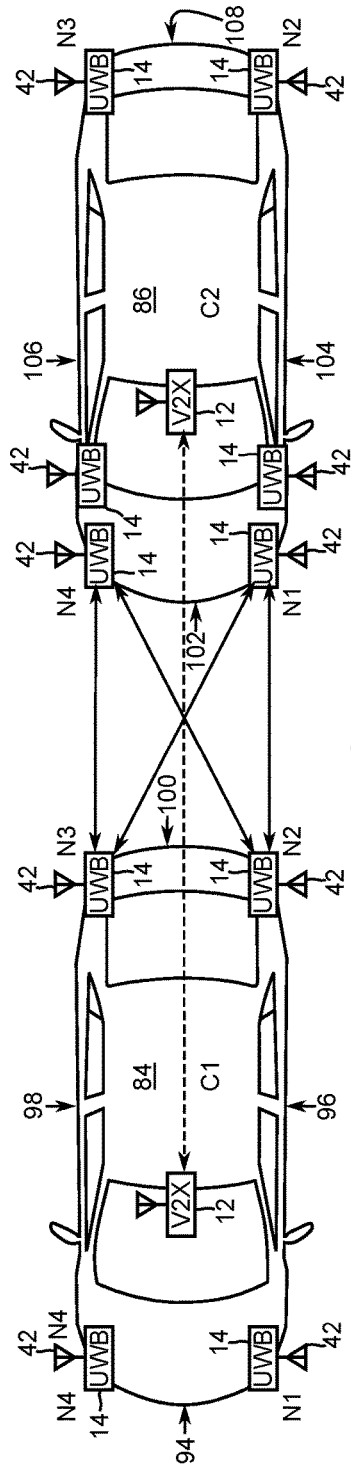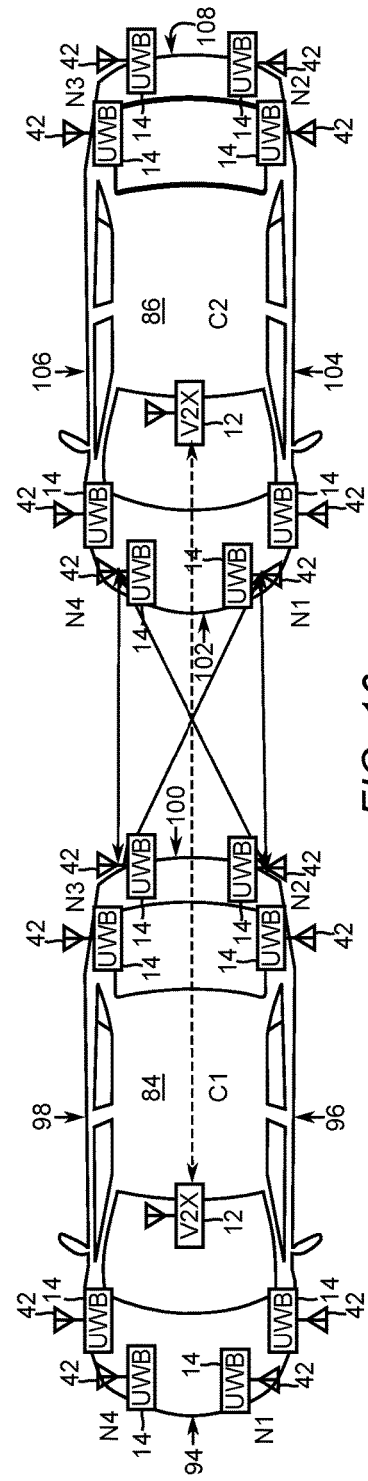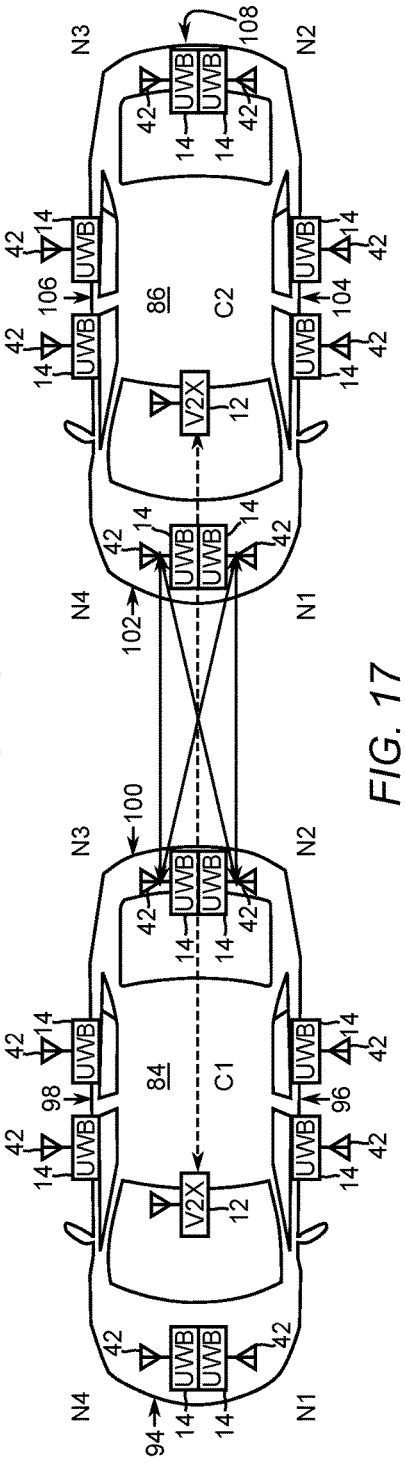

VEHICLE-MOUNTED RANGING SYSTEM AND METHOD OF OPERATING THE SAME

RELATED APPLICATIONS

This application is a continuation of U.S. patent application Ser. No. 17/514,065, filed Oct. 29, 2021, now U.S. Pat. No. 11,722,841, which claims the benefit of provisional patent application Ser. No. 63/137,398, filed Jan. 14, 2021, and claims the benefits of provisional patent application Ser. No. 63/224,888, filed Jul. 23, 2021, the disclosures of which are hereby incorporated herein by reference in their entireties.

FIELD OF THE DISCLOSURE

The present disclosure relates to vehicle-to-everything communications and particularly to systems for making ranging measurements and communicating the ranging measurements between vehicles, infrastructures, and persons.

BACKGROUND

The automotive industry continues to adopt new technologies to enhance consumer experiences, safety, and security. Among today's biggest concerns are severe traffic collisions, an area where technology can be applied to save lives. Many efforts are underway to define, develop, standardize, and implement the best technologies to improve road safety. Initially, manufacturers have used stand-alone advanced driver-assistance systems (ADAS) technologies inside vehicles, such as radar and cameras. With these technologies, each manufacturer could implement its own system without the need for standardization.

The next big leap in safety is for vehicles to share information, enabling them to cooperate with each other. This requires standardization to ensure connectivity of vehicles from different manufacturers. Efforts are underway to provide the basis for connected vehicles by standardizing vehicle-to-everything (V2X) connectivity, including vehicle-to-vehicle (V2V), vehicle-to-infrastructure (V2I), and vehicle-to-pedestrian (V2P) protocols. Standardization efforts pertaining to V2X open a way for the adoption of new technologies that enhance the ADAS and connected autonomous vehicle sensor suites. However, other sensors have disadvantages such as multipath echoes and an inability to cooperate in ranging measurements with other vehicles. What is needed is a system that eliminates inaccurate ranging due to multipath echoes while providing ranging cooperation between vehicles.

SUMMARY

Disclosed is a vehicle-mounted ranging system and method. The vehicle-mounted ranging system has a communication transceiver configured to wirelessly communicate with at least one external communication transceiver and a plurality of ultra-wideband (UWB) transceivers configured to transmit and receive ranging pulses to and from at least one external UWB transceiver associated with the at least one external communication transceiver. A controller is interfaced between the communication transceiver and the plurality of UWB transceivers. The controller is configured to communicate with the associated at least one external communication transceiver to schedule transmission of ranging pulses between the plurality of UWB transceivers and the at least one external UWB transceiver and to calculate ranges between each of the plurality of UWB transceivers and the at least one external UWB transceiver based upon time-of-arrival of ranging pulses transmitted between the plurality of UWB ranging transceivers and the at least one external UWB transceiver.

In another aspect, any of the foregoing aspects individually or together, and/or various separate aspects and features as described herein, may be combined for additional advantage. Any of the various features and elements as disclosed herein may be combined with one or more other disclosed features and elements unless indicated to the contrary herein.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure and, together with the description, serve to explain the principles of the disclosure.

FIG. 4 is a diagram showing ranging paths between two cars with first selected ultra-wideband transceivers during a first time slot.

FIG. 5 is a diagram showing ranging paths between the two cars with second selected ultra-wideband transceivers during a second time slot.

FIG. 6 is a diagram showing ranging paths between the two cars with third selected ultra-wideband transceivers during a third time slot.

FIG. 7 is a diagram showing ranging paths between the two cars with fourth selected ultra-wideband transceivers during a fourth time slot.

FIG. 8 is a diagram generally showing transmit slots setup for ranging between a lead car and a following car.

FIG. 9 is a diagram depicting active transmit slots for active ultra-wideband transceivers transmitting ranging pulses between a backside of a passenger side of the lead car and a front-side of a passenger side of the following car.

FIG. 10 is a diagram depicting active transmit slots for active ultra-wideband transceivers transmitting ranging pulses in a crossbar fashion between the backside of the passenger side of the lead car and a driver side of the front-side of the following car.

FIG. 11 is a diagram depicting active transmit slots for active ultra-wideband transceivers transmitting ranging pulses between the backside of the driver side of the lead car and a front-side of the passenger side of the following car.

FIG. 12 is a diagram depicting active transmit slots for active ultra-wideband transceivers transmitting ranging pulses in the crossbar fashion between the backside of the driver side of the lead car and the passenger side of the front-side of the following car.

FIG. 13 is a diagram depicting timing of the time slots including propagation delays and round robin total time between V2X setup and V2X final.

FIG. 14 is a diagram depicting an orthogonal signal matrix of a finalize data poll.

FIG. 15 is a diagram depicting an exemplary placement of additional UWB transceivers and/or antennas adjacent to front-side mounted UWB transceivers.

FIG. 16 is a diagram depicting an exemplary placement of additional UWB transceivers and/or antennas mounted at the front and rear quarter panels of the lead car and following car.

FIG. 17 is a diagram depicting an exemplary placement of UWB transceivers with antennas positioned for angle-of-arrival measurements of ranging pulses and additional UWB transceivers and/or antennas mounted at the doors of the lead car and following car.

DETAILED DESCRIPTION

Figure 1:
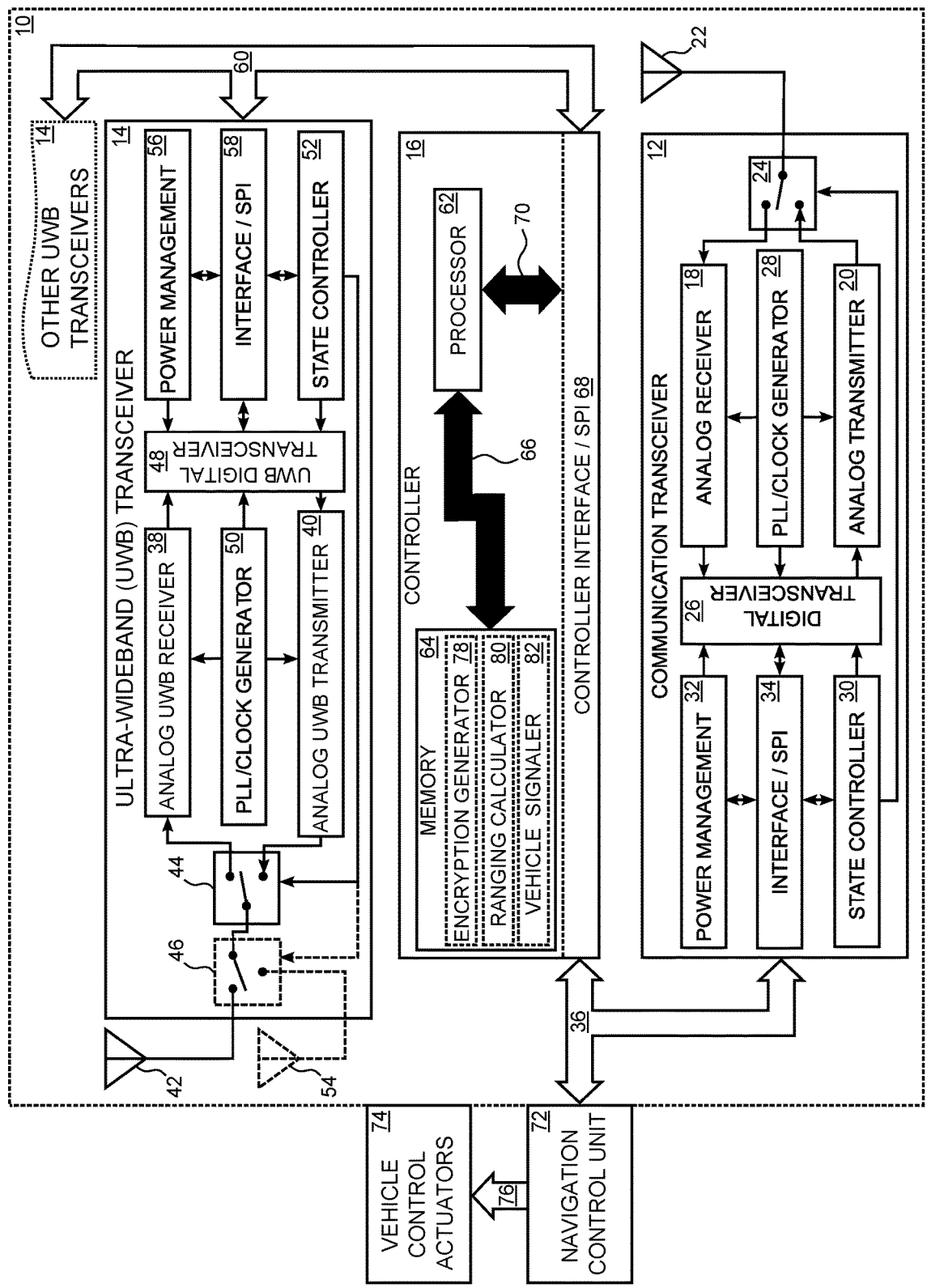
FIG. 1 is a block diagram of a vehicle-mounted ranging system that is structured in accordance with the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein. For this disclosure, the generic term "vehicle-to-everything (V2X)" includes both cellular-V2X (C-V2X) and dedicated short range communications (DSRC).

Embodiments are described herein with reference to schematic illustrations of embodiments of the disclosure. As such, the actual dimensions of the layers and elements can be different, and variations from the shapes of the illustrations as a result, for example, of manufacturing techniques and/or tolerances, are expected. For example, a region illustrated or described as square or rectangular can have rounded or curved features, and regions shown as straight lines may have some irregularity. Thus, the regions illustrated in the figures are schematic and their shapes are not intended to illustrate the precise shape of a region of a device and are not intended to limit the scope of the disclosure. Additionally, sizes of structures or regions may be exaggerated relative to other structures or regions for illustrative purposes and, thus, are provided to illustrate the general structures of the present subject matter and may or may not be drawn to scale. Common elements between figures may be shown herein with common element numbers and may not be subsequently re-described.

FIG. 1 depicts an exemplary embodiment of a vehicle-mounted ranging system 10 having a communication transceiver 12 that is configured to wirelessly communicate with external communication transceivers that are mounted to vehicles and infrastructures or are carried by persons such as pedestrians and roadway construction workers. The vehicle-mounted ranging system 10 further comprises an ultra-wideband (UWB) transceiver 14 that is configured to transmit and receive ranging pulses to and from external UWB transceivers associated with the external communication transceivers. In the exemplary embodiment of FIG. 1, the vehicle-mounted ranging system 10 further includes other UWB transceivers 14.

The vehicle-mounted ranging system 10 also includes a controller 16 that is interfaced between the communication transceiver 12 and the UWB transceivers 14. The controller 16 is configured to communicate with in-range external communication transceivers to schedule transmission of ranging pulses between the UWB transceivers 14 and the in-range external UWB transceivers and calculate ranges between each of the UWB transceivers 14 and the in-range external UWB transceivers 14 based upon time-of-arrival of ranging pulses transmitted between the UWB ranging transceivers 14 and the in-range external UWB transceivers 14.

In greater detail, the communication transceiver 12 includes an analog receiver 18 and an analog transmitter 20 that are each alternately and selectively coupled to a communication antenna 22 through a communication antenna switch 24. A digital transceiver 26 is in communication with the analog receiver 18 and the analog transmitter 20. The digital transceiver 26 is configured to convert analog RF signals received by the analog receiver 18 into digital receive signals and to generate digitally encoded transmit signals that are converted to analog transmit signals that are transmitted by the analog transmitter 20. A phase-locked loop (PLL)/clock generator 28 generates timing signals for the analog receiver 18, the analog transmitter 20, and the digital transceiver 26.

A state controller 30 drives the digital transceiver 26 and the communication switch 24 between a communication transmit mode and a communication receive mode. In the communication transmit mode, the analog transmit signals are transmitted by the analog transmitter 20 through the communication switch 24 to the communication antenna 22. In the communication receive mode, RF signals received by the communication antenna 22 are routed through the communication switch 24 to the analog receiver 18.

A power management block 32 is configured to provide the digital transceiver 26 with managed power such as envelope tracking and average power tracking. The power management block 32 typically receives power from a battery (not shown).

An interface 34 such as a serial peripheral interface (SPI) is in bidirectional communication with the digital transceiver 26. The interface 34 is also in bidirectional communication with the controller 16 over a first communication bus 36.

Also in greater detail, the UWB transceiver 14 includes an analog UWB receiver 38 and an analog UWB transmitter 40 that are each alternately and selectively coupled to a first UWB antenna 42 through a first UWB antenna switch 44 and a second UWB antenna switch 46. A UWB digital transceiver 48 is in communication with the analog UWB receiver 38 and the analog UWB transmitter 40. The UWB digital transceiver 48 is configured to convert analog RF signals received by the analog UWB receiver 38 into digital UWB signals and to generate digitally encrypted UWB signals that are converted to analog ranging signals that are transmitted by the analog UWB transmitter 40. A phase-locked loop (PLL)/clock generator 50 generates timing signals for the analog UWB receiver 38, the analog UWB transmitter 40, and the UWB digital transceiver 48.

A state controller 52 drives the UWB digital transceiver 48 and the communication switch 24 between a UWB transmit mode and a UWB receive mode. In the UWB transmit mode, the UWB transmit signals in the form of ranging pulses are transmitted by the analog UWB transmitter 40 through the first UWB antenna switch 44 and the second UWB antenna switch 46 to the first UWB antenna 42. In the UWB receive mode, RF signals received by the first UWB antenna 42 and/or a second UWB antenna 54 are routed through the second UWB antenna switch 46 and the first UWB antenna switch 44 to the analog UWB receiver 38.

A power management block 56 is configured to provide the UWB digital transceiver 48 with managed power such as envelope tracking and average power tracking. The power management block 56 typically receives power from a battery (not shown).

An interface 58 such as a serial peripheral interface (SPI) is in bidirectional communication with the UWB digital transceiver 48. The interface 58 is also in bidirectional communication with the controller 16 over a second communication bus 60.

In greater detail, the controller 16 includes a processor 62 and a memory 64, which may be a mix of random access memory (RAM) for storing volatile data including processor instructions and read-only memory (ROM) for storing non-volatile data and firmware that includes processor instructions. The processor 62 is in bidirectional communication with the memory 64 over a first internal bus 66. The controller 16 further includes a controller interface 68 such as a SPI. The processor 62 is in communication with the controller interface 68 over a second internal bus 70. The controller interface 68 is communicably coupled to both the first communication bus 36 and the second communication bus 60, both of which may be a wired bus or a wireless bus. Examples of suitable wired buses and wireless buses include but are not limited to controller area network (CAN) buses in both hardwired and wireless forms.

The processor 62 communicates with the UWB transceivers 14 through the controller interface 68 and over the second communications bus 60. The processor 62 communicates with the communication transceiver 12 through the controller interface 68 and over the first communication bus 36. The processor 62 further communicates through the controller interface 68 and over the first communications bus 36 to a navigation control unit 72 that controls the motion of a vehicle to which the vehicle-mounted ranging system 10 is mounted. The navigation control unit 72 may include but is not limited to cameras, radar, lidar, ultrasonic sensors, a steering angle sensor, an odometer, an inertial management unit (IMU), and a global navigation satellite system (GNSS) receiver. The navigation control unit 72 also typically includes an extended Kalman filter. The navigation control unit 72 is in communication with vehicle control actuators 74 over a control bus 76 that may be a CAN bus.

The memory 64 may include an encryption generator 78 that is configured to encrypt communication packets between the communications transceiver 12 and other communication transceivers associated with other vehicles, pedestrians, and infrastructure elements. The memory 64 also includes a ranging calculator 80 that is configured to calculate ranges based upon time-of-arrival of ranging pulses transmitted between UWB transceivers 14 and UWB transceivers associated with other vehicles, pedestrians, and infrastructure elements. The ranging calculator 80 may be further configured to calculate ranges based upon angle-of-arrival of ranging pulses transmitted between UWB transceivers 14 and UWB transceivers associated with other vehicles, pedestrians, and infrastructure elements. In at least some embodiments the UWB transceivers 14 are configured to encrypt packets that accompany the ranging pulses in order to defeat malicious spoofing attempts.

The memory 64 further includes a vehicle signaler 82 that is configured to send signals to the navigation control unit 72 by way of the processor 62, the second internal bus 70, the controller interface 68, and the first bus 36. The signals may include but are not limited to signals to apply brakes, apply the accelerator, steer left and steer right, and apply turn signals left and right. The signals also include values calculated by the processor 62 that inform the navigation control unit 72 as to how much braking, acceleration, and steering to apply. In response to the signals generated by the vehicle signaler 82, the navigation control unit 72 drives the vehicle control actuators 74 to apply the braking, acceleration, and steering. The controller 16 including the processor 62, the encryption generator 78, the ranging calculator 80, and the vehicle signaler 82 may be implemented in hardware using logic gates of an application-specific integrated circuit (ASIC). In other embodiments, the controller 16 including the processor 62, the encryption generator 78, the ranging calculator 80, and the vehicle signaler 82 may be implemented in the logic gates of a field-programmable gate array (FPGA).

Figure 2:
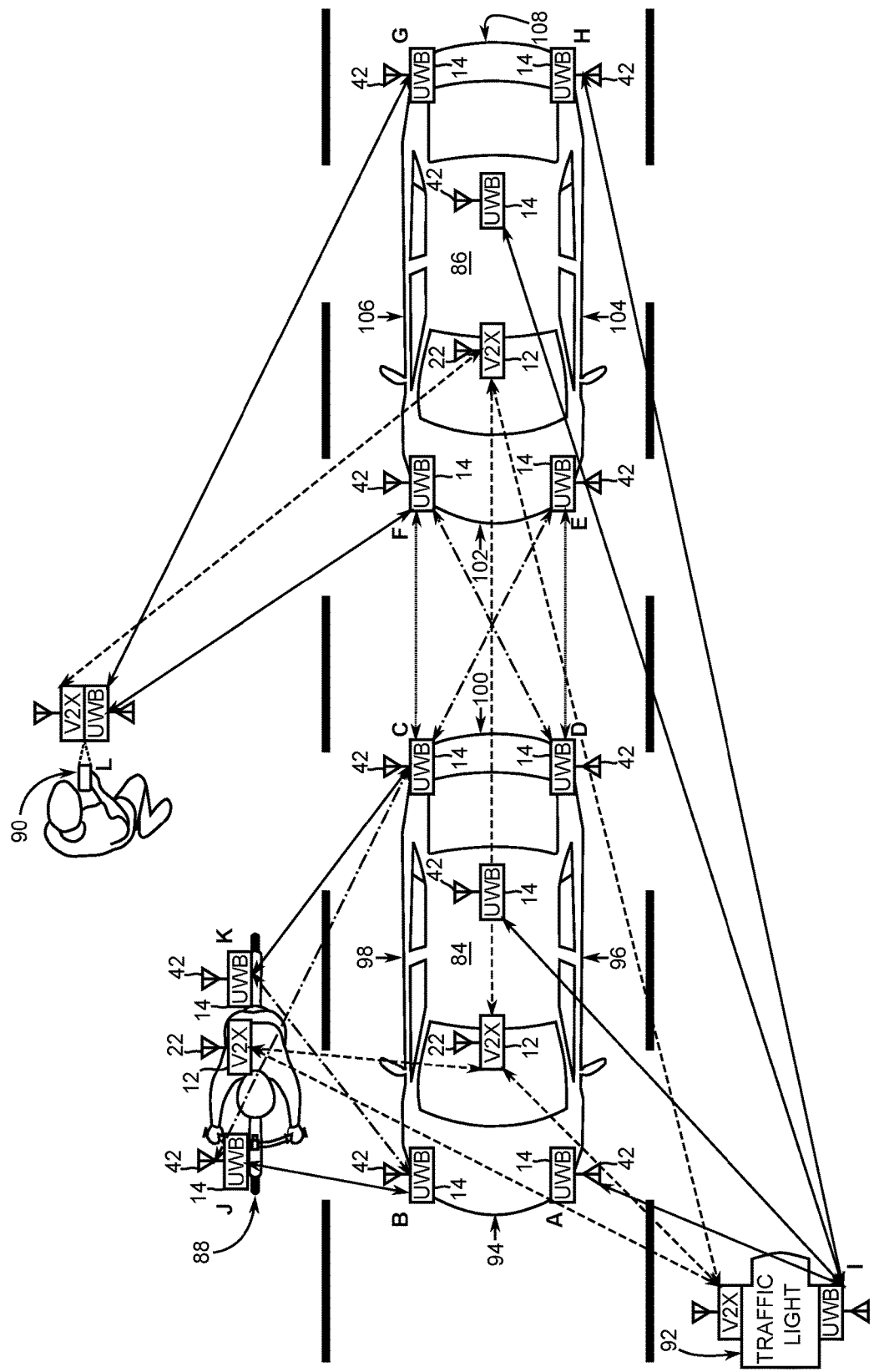
FIG. 2 is a diagram showing the use of an exemplary embodiment to range distances between a bicyclist, or other vulnerable road user (VRU) such as a motorcycle or a mobility scooter; a pedestrian; infrastructure; and another vehicle.

FIG. 2 depicts a lead vehicle 84 employing an embodiment of the vehicle-mounted ranging system 10 followed by a trailing vehicle 86 that also employs another embodiment of the vehicle-mounted ranging system 10. The lead vehicle 84 and the trailing vehicle 86 form a platoon of vehicles in the exemplary depiction of FIG. 2. Yet another embodiment of the vehicle-mounted ranging system 10 is employed on a bicycle 88 that is depicted adjacent to a passenger side of the lead vehicle 84. A pedestrian near the bicycle 88 is holding a communication device 90 that may be configured to communicate with communication transceivers 12 that are associated with the lead vehicle 84, the trailing vehicle 86, the bicycle 88, and infrastructure 92 such as a traffic light. The infrastructure 92 may also be, but is not limited to, a stop sign, a yield sign, a speed limit sign, a traffic cone, and roadside kiosk.

The communication device 90 is shown configured with V2X and UWB functions that are compatible with the communication transceivers 12 and the UWB transceivers 14. The communication device 90 may be, but is not limited to, a smartphone, a smart watch, or a tablet.

The lead vehicle 84 has a front-side 94, a left-side 96 laterally spaced from a right-side 98, and a backside 100 coupled to the front-side 94 by the left-side 96 and the right-side 98, wherein the corresponding antenna 42 of a first one of the UWB transceivers 14 is mounted to the lead vehicle 84 at a first location A that is proximal to both the front-side 94 and the left-side 96, the corresponding antenna 42 of a second one of the UWB transceivers 14 is mounted to the lead vehicle 84 at a second location B that is proximal to the front-side 94 and the right-side 98, the corresponding antenna of a third one of the UWB transceivers 14 is mounted to the lead vehicle 84 at a third location C that is proximal to the backside 100 and the right-side 98, and the corresponding antenna of a fourth one of the UWB transceivers 14 is mounted to the lead vehicle 84 at a fourth location D that is proximal to the backside 100 and the left-side 96.

The trailing vehicle 86 has a front-side 102, a left-side 104 laterally spaced from a right-side 106, and a backside 108 coupled to the front-side 102 by the left-side 104 and the right-side 106, wherein the corresponding antenna 42 of a first one of the UWB transceivers 14 is mounted to the trailing vehicle 86 at a fifth location E that is proximal to both the front-side 102 and the left-side 104, the corresponding antenna 42 of a second one of the UWB transceivers is mounted to the trailing vehicle 86 at a sixth location F that is proximal to the front-side 102 and the right-side 106, the corresponding antenna 42 of a third one of the UWB transceivers is mounted to the trailing vehicle 86 at a seventh location G that is proximal to the backside 108 and the right-side 106, and the corresponding antenna 42 of a fourth one of the UWB transceivers 14 is mounted to the trailing vehicle 86 at an eighth location H that is proximal to the backside 108 and the left-side 104.

In one exemplary embodiment, the controller 16 is further configured to use the ranging calculator 80 to calculate distance between the fourth location D and the sixth location F, and to measure distance between the third location C and the fifth location E when the second vehicle 86 is following the first vehicle 84 using ranging pulse time-of-arrival measurements made by the plurality of UWB transceivers 14. This crossbar ranging depicted in dot-dashed arrowed lines provides additional accuracy over shortest path ranging depicted in solid arrowed lines. Dashed arrowed lines depict communication paths between communication transceivers 12 and other V2X transceivers associated with the bicycle 88, the pedestrian 90, and the infrastructure 92. The controller 16 is also shown simultaneously ranging the bicycle 68 using the present disclosure's crossbar ranging by calculating distance between location B and location K and calculating distance between location C and location J. The ranging between the pedestrian's communication device 90 and the second vehicle is depicted being measured between the UWB transceiver 14 at location L and the UWB transceivers 14 at locations F and G using ranging pulse time-of-arrival measurements. Ranges between the infrastructure 92 are shown being measured between the UWB transceiver 14 at location A, the UWB transceiver 14 on a topside (e.g., roof) of the first vehicle 84, and the infrastructure UWB transceiver at location I. Ranges between the infrastructure 92 are also shown being measured between the UWB transceiver 14 at location H, the UWB transceiver 14 on the roof of the second vehicle 86, and the infrastructure UWB transceiver at location I. The ranges may be calculated by the ranging calculator either by using ranging pulse time-of-arrival measurements or by ranging pulse angle-of-arrival measurements or both. It is to be understood that the UWB transceivers 14 and/or antennas 42 may be located on bumpers at the front-sides 94, 102 and the backsides 100, 108. UWB transceivers 14 and/or antennas 42 may also located in door handles and or mirrors of the lead vehicle 84 and second vehicle 86. Moreover, the communication transceivers 12 and or communications antennas 22 may be located or co-located with any of the locations of the UWB transceivers 14.

Figure 3:
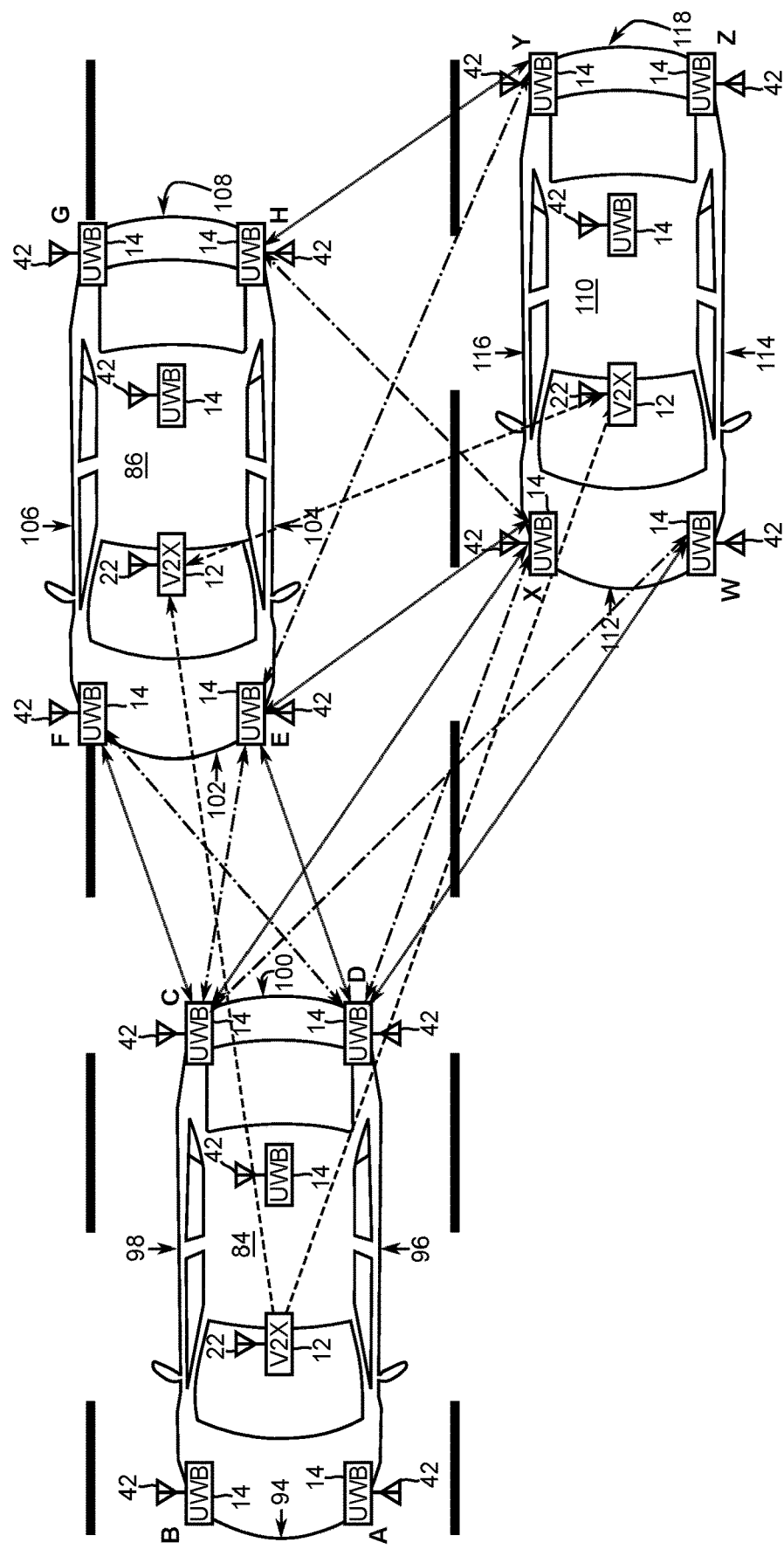
FIG. 3 is a diagram showing the use of an exemplary embodiment of the vehicle-mounted ranging system to assist in lane changing in accordance with the present disclosure.

FIG. 3 is a diagram showing the use of an exemplary embodiment of the vehicle mounted ranging system 10 to assist in lane changing in accordance with the present disclosure. A third vehicle 110 has a front-side 112, a left-side 114 laterally spaced from a right-side 116, and a backside 118 coupled to the front-side 112 by the left-side 114 and the right-side 116, wherein the corresponding antenna 42 of a first one of the UWB transceivers 14 is mounted to the third vehicle 110 at a ninth location W that is proximal to both the front-side 112 and the left-side 114, the corresponding antenna 42 of a second one of the UWB transceivers 14 is mounted to the third vehicle 110 at a tenth location X that is proximal to the front-side 112 and the right-side 116, the corresponding antenna of a third one of the UWB transceivers 14 is mounted to the third vehicle 110 at an eleventh location Y that is proximal to the backside 118 and the right-side 116, and the corresponding antenna of a fourth one of the UWB transceivers 14 is mounted to the third vehicle at a twelfth location Z that is proximal to the backside 118 and the left-side 114. In the scenario depicted in FIG. 3, the third vehicle 110 has left a platoon led by the lead vehicle 84, and the second vehicle 86 is in the process of changing lanes to the right in order also to leave the platoon. During this critical phase of breaking up the platoon formation, the lead vehicle 84, the second vehicle 86, and the third vehicle 110 are in communication with each other as depicted by dashed arrowed lines between the communication transceivers 12, which in this case are labeled V2X.

Additional crossbar ranging is setup between the lead vehicle 86 and the third vehicle 110 and between the second vehicle 86 and the third vehicle 110 as depicted in the dot-dash arrowed lines. Direct ranging is simultaneously implemented as depicted in solid arrowed lines. The combination of crossbar ranging and direct ranging provides centimeter scale distance ranging during this critical lane changing phase.

In some embodiments, the communication transceivers 12 may be cellular vehicle-to-everything (C-V2X) communication transceivers that use (user equipment-to-user equipment communication over a direct channel) on the 5.9 GHz band as defined by C-V2X specifications and Federal Communications Commission regulations. In other embodiments, the communications transceivers 12 may be dedicated short-range communication (DSRC) transceivers based on WiFi specifications. The UWB transceiver 14 may use protocols established in the IEEE 802.15.4a or 802.15.4z, including two-way ranging to multiple UWB transceivers 14 practically simultaneously.

FIGS. 4-7 are diagrams showing ranging paths between the lead vehicle 84, which is a car and is also labeled C1, and the following vehicle 86, which is a car and is also labeled C2. Four of the UWB transceivers 14 are labeled N1, N2, N3, and N4 for each of the lead car C1 and the following car C2. The UWB transceivers 14 labeled N1 are located at a driver side of the front-side 94, 102 of each of the lead car C1 and the following car C2. The UWB transceivers 14 labeled N2 are located at the left-side 96, 104 of the backside 100, 108 of each of the lead car C1 and the following car C2. The UWB transceivers 14 labeled N3 are located at the right-side 98, 106 of the backside 100, 108 of each of the lead car C1 and the following car C2. The UWB transceivers 14 labeled N4 are located at the right-side 98, 106 side of the front-side 94, 102 of each of the lead car C1 and the following car C2. FIG. 4 is a diagram showing ranging paths between the lead car C1 and the following car C2 with first selected UWB transceivers during a first time slot. The first selected UWB transceivers are N3 of lead car C1 and N1 and N4 of the following car C2. In this case, UWB transceivers N1 and N4 of following car C2 are receiving ranging pulses from the UWB transceiver N3 of the lead car C1.

FIG. 5 is a diagram showing ranging paths between the two cars C1 and C2 with second selected UWB transceivers during a second time slot. The second selected UWB transceivers are N2 of lead car C1 and N1 and N4 of the following car C2. In this case, UWB transceivers N1 and N4 of the following car C2 are receiving ranging pulses from the UWB transceiver N2 of the lead car C1.

FIG. 6 is a diagram showing ranging paths between the two cars C1 and C2 with third selected UWB transceivers during a third time slot. The third selected UWB transceivers are N2 and N3 of lead the car C1 and N4 of the following car C2. In this case, UWB transceivers N2 and N3 of lead car C1 are receiving ranging pulses from the UWB transceiver N4 of the following car following C2.

FIG. 7 is a diagram showing ranging paths between the two cars C1 and C2 with fourth selected ultra-wideband transceivers during a fourth time slot. The fourth selected UWB transceivers are N2 and N3 of the lead car C1 and N1 of the following car C2. In this case, UWB transceivers N2 and N3 of the lead car C1 are receiving ranging pulses from the UWB transceiver N1 of the following car C2.

FIG. 8 is a diagram generally showing transmit slots setup for ranging between the lead car C1 and the following car C2. The transmit time slots correspond directly with FIGS. 4 through 7.

FIG. 9 is a diagram depicting active transmit slots for active ultra-wideband transceivers transmitting ranging pulses between the backside 100 of a left-side 98 of the lead car C1 and the front-side 102 of the left-side 106 of the following car C2. In this case transmit slot 1 and transmit slot 3 are labeled in bold type to indicate that these time slots are used to calculate time-of-flight (TOF) from the lead car 1 UWB transceiver N3 (C1N3) to the following car C2, UWB transceiver N4 (C2N4).

FIG. 10 is a diagram depicting active transmit slots for active ultra-wideband transceivers transmitting ranging pulses in a crossbar fashion between the backside 100 of the right-side 98 of the lead car C1 and the left-side 104 of the front-side 102 of the following car C2. In this case, transmit slot 1 and transmit slot 4 are labeled in bold type to indicate that these time slots are used to calculate time-of-flight from the lead car 1 UWB transceiver N3 (C1N3) to the following car C2 UWB transceiver N1 (C2N1).

FIG. 11 is a diagram depicting active transmit slots for active ultra-wideband transceivers transmitting ranging pulses between the backside 100 of the left-side 96 of the lead car C1 and the front-side 102 of the left-side 104 of the following car C2. In this case, transmit slot 2 and transmit slot 4 are labeled in bold type to indicate that these time slots are used to calculate time-of-flight from lead car 1 UWB transceiver N2 (C1N2) to the following car C2 UWB transceiver N1 (C2N1).

FIG. 12 is a diagram depicting active transmit slots for active ultra-wideband transceivers transmitting ranging pulses in the crossbar fashion between the backside 100 of the left-side 96 of the lead car C1 and the right-side 106 of the front-side 102 of the following car C2. In this case, transmit slot 2 and transmit slot 3 are labeled in bold type to indicate that these time slots are used to calculate time-of-flight from lead car C1 UWB transceiver N2 (C1N2) to the following car C2 UWB transceiver N4 (C2N4).

FIG. 13 is a diagram depicting timing of the time slots including propagation delays and round robin total time between V2X setup and V2X final. In this case, the round robin total time is an exemplary 1.2 milliseconds.

FIG. 14 is a diagram depicting an orthogonal signal matrix of a finalize data poll. The letter T written into each cell corresponding to a transmit time slot, car, and UWB transceiver represents a received timestamp.

Overall, the present disclosure provides a combination of a ranging and security by way of the controller 16, and the communication transceiver 12—which may be a C-V2X communication device or a DSRC communication device, where X is another vehicle, a person, or an infrastructure—and ultra-wideband (UWB) ranging transceivers 14 to increase the accuracy in an Advanced Driver-Assistance Systems (ADAS) system and autonomous vehicles (AV) that do not utilize drivers. In this disclosure, ADAS and AV are referred to as AAV. The vehicle-mounted ranging system 10 according to the present disclosure can then have various methods applied to provide different embodiments.

The controller 16 manages the overall distance calculation system. This may be part of or may be tightly integrated with an AAV system. The AAV system uses the C-V2X for various protocols. These protocols set up a communication network between adjacent vehicles traveling on a highway. Once the adjacent vehicles are identified, then the vehicle-mounted ranging system 10 may be utilized to establish a highly accurate position of adjacent vehicles. The AAV system using a Global Navigation Satellite System may have a general idea of the position of adjacent vehicles but no detailed location of, for example, a front right bumper. The vehicle-mounted ranging system according to the present disclosure provides relatively much faster centimeter relative locations of adjacent vehicles. In other embodiments, the AAV system uses DSRC protocols to set up a communication network between adjacent vehicles traveling on a highway.

Once the AAV establishes the connection with an adjacent vehicle, infrastructure, or person (AVIP), it can request identification information for that AVIP. Using that identification information, this embodiment according to the present disclosure can then communicate with that AVIP.

The controller 10 can then set up a secure communication link and secure scrambling codes for the UWB ranging algorithms. The controller 10 can then jointly set up a ranging session to determine the distance to the various sensors on the AVIP. Once the UWB transceivers 14 gather the time-of-flight information to each of the sensors on the AVIP, they can then calculate the three-dimensional (3D) position of the AVIP, including height and distance. This is critical to accurately project the distance onto a ground plane.

A V2X link uses the communication transceivers 12 to communicate between vehicles and set up all parameters needed for the UWB transceivers 14 to start ranging. Once ranging is complete, the V2X link can then be used to communicate the calculated distances to the AVIP. Other information may also be exchanged, such as the location of the various UWB devices on the AVIP. Also, various security protocols can be used to ensure the system is correctly talking with the AVIP and is not being spoofed.

Using relative position calculations over time, the acceleration, deceleration, relative movement left or right can be determined, and safe distances can be maintained or braking/acceleration applied as needed. Uses of the vehicle-mounted ranging system 10 may include but are not limited to communication from one vehicle to a nearby vehicle to determine the distance between the two and using that distance to calculate the location of different parts of the vehicle to within centimeter accuracy. Other uses of the vehicle-mounted ranging system 10 may be used to provide assistance in group start from a traffic light, provide indication for emergency braking, provide assisted lane changing, provide assistance in platooning, and provide assistance in entering and exiting a platoon.

Still other uses of the vehicle-mounted ranging system 10 may include but are not limited to communication from one vehicle to a nearby person to determine the distance between them and then to calculate a centimeter level location of the person. The location of the person is then used to maintain a safe distance between the vehicle and the person by employing the vehicle signaler 82 (FIG. 1) to determine if the vehicle should apply braking and send a braking signal to the navigation control unit 72. The vehicle-mounted ranging system 10 may also be employed to determine the location of the person holding communication device 90 (FIG. 2) to identify a specific target such as for Uber pickup. Moreover, the controller 16 of the vehicle-mounted ranging system 10 in at least some embodiments is configured to allow a properly identified person access to the vehicle.

Yet other uses of the vehicle-mounted ranging system 10 include communication from one vehicle to a nearby infrastructure to determine the distance between them and then using that distance to calculate the location of the infrastructure to within centimeter level accuracy. The controller 16 is configured to use the calculated location of the infrastructure to maintain a safe distance between the vehicle and the infrastructure. For example, the vehicle signaler 82 is configured to determine if the vehicle should apply braking and to determine how the vehicle should steer to avoid colliding with the infrastructure.

The vehicle-mounted ranging system 10 may also be employed to determine the location of a parking spot and to assist in centering in the parking spot. The vehicle-mounted ranging system 10 may further be employed to determine the location over a wireless charging port or find a kiosk to assist in toll or parking access and payment.

Moreover, the vehicle-mounted ranging system 10 may also be configured to cooperate with automotive radar, lidar, cameras, and other systems to provide high accuracy location determination. However, the benefits of the UWB transceivers over automotive radar, lidar, cameras, and other systems include the following. The UWB transceivers 14 measure distance between each other, whereas radar reflects from a surface and then averages to the middle of a surface. With an angled surface, the distance measured by radar is not accurate to a specific point. The UWB transceivers also cooperatively determine when to transmit ranging pulses, thereby reducing the probability of interference. For example, in heavy traffic, with radar devices on each vehicle and each radar device acting independently, communication and ranging interference can occur. Lastly, the UWB transceivers 14 transmit at least an order of magnitude less power than a comparable automotive radar.

FIG. 15 is a diagram depicting an exemplary placement of additional UWB transceivers 14 and/or antennas 42 adjacent to front-side mounted UWB transceivers. FIG. 16 is a diagram depicting an exemplary placement of additional UWB transceivers 14 and/or antennas 42 mounted at the front and rear quarter panels of the lead car C1 and the following car C2. In some embodiments, the antenna 42 corresponding to each of the plurality of UWB transceivers 14 is mounted to the lead car C1 and the following car C2 at locations that provide 180 degree ranging coverage for each of the frontside, the leftside, the rightside, and the backside. In some embodiments, the antenna 42 corresponding to each of the plurality of UWB transceivers 14 is mounted to the lead car C1 and the following car C2 at locations that provide 180 degree ranging coverage for each of the frontside, the leftside, the rightside, and the backside. In some embodiments, each antenna 42 corresponding to each of the plurality of UWB transceivers 14 is mounted to the corners of the lead car C1 and following car C2 to provide 270 degrees of ranging coverage for each of the corners.

FIG. 17 is a diagram depicting an exemplary placement of UWB transceivers 14 with antennas 42 positioned for angle-of-arrival measurements of ranging pulses and additional UWB transceivers 14 and/or antennas 42 mounted at doors of the lead car C1 and following car C2. In some embodiments, each of the antennas 42 is mounted to the lead car C1 and following car C2 at multiple wavelengths from each other to provide ranging pulse reception that is usable by the controller 16 to calculate angle-of-arrival of the ranging pulses. In at some of these embodiments, the controller 16 is also configured to calculate distance measurements by either or both time-of-arrival and angle-of arrival.

It is contemplated that any of the foregoing aspects, and/or various separate aspects and features as described herein, may be combined for additional advantage. Any of the various embodiments as disclosed herein may be combined with one or more other disclosed embodiments unless indicated to the contrary herein.

Those skilled in the art will recognize improvements and modifications to the preferred embodiments of the present disclosure. All such improvements and modifications are considered within the scope of the concepts disclosed herein and the claims that follow.

What is claimed is:

1. A method of operating a vehicle-mounted ranging system having a communication transceiver configured to wirelessly communicate with at least one external communication transceiver, a plurality of ultra-wideband (UWB) transceivers configured to transmit and receive ranging pulses to and from a UWB transceiver of the at least one external communication transceiver, and a controller interfaced with the communication transceiver and the plurality of UWB transceivers, the method comprising:

communicating wirelessly with the at least one external communication transceiver to schedule transmission of ranging pulses between the plurality of UWB transceivers and the at least one external communication transceiver by way of the communication transceiver under control of the controller;

configuring by way of the controller the plurality of UWB transceivers with the schedule of the transmission of the ranging pulses; and calculating by way of the controller ranges between each of the plurality of UWB transceivers and at least one UWB transceiver of the at least one external communication transceiver based upon time-of-arrival of ranging pulses transmitted between the plurality of UWB transceivers and the at least one UWB transceiver of the at least one external communication transceiver.

2. The method of operating the vehicle-mounted ranging system of claim 1 further comprising setting up a secure communications link between the communication transceiver and the at least one external communication transceiver by way of the controller.

3. The method of operating the vehicle-mounted ranging system of claim 2 further comprising providing by way of the controller the plurality of UWB transceivers with secure scrambling codes for UWB ranging.

4. The method of operating the vehicle-mounted ranging system of claim 3 wherein at least one object on which the communication transceiver and the at least one external communication transceiver are held is a pedestrian.

5. The method of operating the vehicle-mounted ranging system of claim 3 wherein at least one object on which the communication transceiver and the at least one external UWB transceiver are held is a vulnerable road user.

6. The method of operating the vehicle-mounted ranging system of claim 3 wherein at least one object on which the communication transceiver and the at least one external UWB transceiver are mounted is an infrastructure component.

7. The method of operating the vehicle-mounted ranging system of claim 1 wherein each of the plurality of UWB transceivers has a corresponding antenna that is configured to transmit and receive the ranging pulses.

8. The method of operating the vehicle-mounted ranging system of claim 7 wherein a first vehicle has a front-side, a left-side laterally spaced from a right-side, and a backside coupled to the front-side by the left-side and the right-side, wherein the corresponding antenna of a first one of the plurality of UWB transceivers is mounted to the first vehicle at a first location that is proximal to both the front-side and the left-side, the corresponding antenna of a second one of the plurality of UWB transceivers is mounted to the first vehicle at a second location that is proximal to the front-side and the right-side, the corresponding antenna of a third one of the plurality of UWB transceivers is mounted to the first vehicle at a third location that is proximal to the backside and the right-side, and the corresponding antenna of a fourth one of the plurality of UWB transceivers is mounted to the first vehicle at a fourth location that is proximal to the backside and the left-side.

9. The method of operating the vehicle-mounted ranging system of claim 8 wherein the at least one external communication transceiver and at least one external UWB transceiver are mounted to at least a second vehicle that is different from the first vehicle.

10. The method of operating the vehicle-mounted ranging system of claim 9 wherein the at least a second vehicle has a front-side, a left-side laterally spaced from a right-side, and a backside coupled to the front-side by the left-side and the right-side, wherein the corresponding antenna of a first one of the at least one external UWB transceiver is mounted to the second vehicle at a fifth location that is proximal to both the front-side and the left-side, the corresponding antenna of a second one of the at least one external UWB transceiver is mounted to the second vehicle at a sixth location that is proximal to the front-side and the right-side, the corresponding antenna of a third one of the at least one external UWB transceiver is mounted to the second vehicle at a seventh location that is proximal to the backside and the right-side, and the corresponding antenna of a fourth one of the at least one external UWB transceiver is mounted to the second vehicle at an eighth location that is proximal to the backside and the left-side.

11. The method of operating the vehicle-mounted ranging system of claim 10 further comprising calculating by way of the controller a distance between the first location and the seventh location, and measuring distance between the second location and the eighth location when the first vehicle is following the second vehicle using ranging pulse time-of-arrival measurements made by the plurality of UWB transceivers.

12. The method of operating a vehicle-mounted ranging system of claim 11 wherein the communication transceiver has a communication antenna mounted to the first vehicle at a location that is proximal to a topside of the first vehicle.

13. The method of operating the vehicle-mounted ranging system of claim 10 further comprising calculating a distance between the second location and the eighth location, and measuring distance between the third location and the fifth location when the first vehicle is substantially beside the second vehicle using ranging pulse time-of-arrival measurements made by the plurality of UWB transceivers.

14. The method of operating the vehicle-mounted ranging system of claim 10 further comprising calculating by way of the controller a distance between the fourth location and the sixth location and measuring distance between the third location and the fifth location when the second vehicle is following the first vehicle using ranging pulse time-of-arrival measurements made by the plurality of UWB transceivers.

15. The method of operating a vehicle-mounted ranging system of claim 13 further comprising calculating by way of the controller a distance between the fourth location and the fifth location, and measuring a distance between the third location and the sixth location when the second vehicle is following the first vehicle using ranging pulse time-of-arrival measurements made by the plurality of UWB transceivers.

16. The method of operating the vehicle-mounted ranging system of claim 10 further comprising calculating by way of the controller a distance between the first location and the eighth location, and measuring distance between the second location and the seventh location when the first vehicle is following the second vehicle using ranging pulse time-of-arrival measurements made by the plurality of UWB transceivers.

17. The method of operating the vehicle-mounted ranging system of claim 10 further comprising calculating by way of the controller a distance between the second location and the fifth location, and measuring distance between the third location and the eighth location when the first vehicle is substantially beside the second vehicle using ranging pulse time-of-arrival measurements made by the plurality of UWB transceivers.

18. The method of operating a vehicle-mounted ranging system of claim 8 wherein the corresponding antenna of a fifth one of the plurality of UWB transceivers is mounted to the first vehicle at a location that is proximal to a topside of the vehicle.

19. The method of operating a vehicle-mounted ranging system of claim 1 wherein each of the plurality of UWB transceivers has an extra antenna that is configured to transmit and receive the ranging pulses that is spaced from the corresponding antenna to measure angle-of-arrival of the ranging pulses.

20. The method of operating a vehicle-mounted ranging system of claim 19 further comprising, by way of the controller, calculating distance measurements by both time-of-arrival and angle-of arrival.

21. A method of operating a vehicle-mounted ranging system having a communication transceiver configured to wirelessly communicate with at least one external communication transceiver, at least one ultra-wideband (UWB) transceiver configured to transmit and receive ranging pulses to and from an external UWB transceiver of the at least one external communication transceiver, and a controller interfaced with the communication transceiver and the at least one UWB transceiver, the method comprising:

communicating wirelessly with the at least one external communication transceiver to schedule transmission of ranging pulses between the at least one UWB transceiver and the at least one external communication transceiver by way of the communication transceiver under control of the controller;

configuring by way of the controller the plurality of UWB transceivers with the schedule of the transmission of the ranging pulses; and calculating by way of the controller ranges between the at least one UWB transceiver and at least one external UWB transceiver of the at least one external communication transceiver based upon time-of-arrival of ranging pulses transmitted between the at least one UWB transceiver and the at least one external UWB transceiver of the at least one external communication transceiver.

22. The method of operating the vehicle-mounted ranging system of claim 21 wherein the at least one external communication transceiver and at least one external UWB transceiver are mounted to at least a second vehicle that is different from the first vehicle.

23. The method of operating the vehicle-mounted ranging system of claim 22 wherein the at least one UWB transceiver is two UWB transceivers spaced apart and mounted proximal to a first surface of the first vehicle and the at least one external UWB transceiver is two external UWB transceivers spaced apart and mounted proximal to a second surface of the second vehicle.

24. The method of operating the vehicle-mounted ranging system of claim 23 further comprising measuring range by way of the controller utilizing ranging pulses received in crossbar fashion between the two UWB transceivers spaced apart and mounted proximal to the first surface of the first vehicle and the two external UWB transceivers spaced apart and mounted proximal to the second surface of the second vehicle.

25. The method of operating the vehicle-mounted ranging system of claim 21 wherein the at least one external transceiver is a plurality of external transceivers mounted or carried by different vehicles, pedestrians, and infrastructure.

26. The method of operating the vehicle-mounted ranging system of claim 21 further comprising measuring range between the at least one UWB transceiver and the at least one external UWB transceiver by way of the controller measuring time-of-arrival of the ranging pulses.

27. The method of operating the vehicle-mounted ranging system of claim 21 further comprising measuring range between the at least one UWB transceiver and the at least one external UWB transceiver by measuring angle-of-arrival of the ranging pulses.

* * * * *

UNITED STATES PATENT AND TRADEMARK OFFICE
CERTIFICATE OF CORRECTION

| | | |
|---|---|---|
| PATENT NO. | : 12,114,226 B2 | |
| APPLICATION NO. | : 18/231137 | |
| DATED | : October 8, 2024 | |
| INVENTOR(S) | : Kerry Cloyce Glover | |

It is certified that error appears in the above-identified patent and that said Letters Patent is hereby corrected as shown below:

In the Specification

In Column 8, Line 29, replace "ranging calculator either" with --ranging calculator 80 either--.

In Column 9, Line 11, replace "that use (user" with --that use 5G PC5 (user--.

Signed and Sealed this
Fifth Day of November, 2024

Katherine Kelly Vidal
*Director of the United States Patent and Trademark Office*